United States Patent [19]

Rydell

[11] 4,279,555
[45] Jul. 21, 1981

[54] MACHINE FOR STACKING PANELS

[76] Inventor: Edmund W. F. Rydell, 14926 Minnetonka Industrial Rd., Minnetonka, Minn. 55343

[21] Appl. No.: 974,330

[22] Filed: Dec. 29, 1978

[51] Int. Cl.³ ............................................ B65G 57/112
[52] U.S. Cl. ..................................... 414/83; 198/382; 198/434; 198/594; 271/189; 271/201; 271/227; 271/245; 414/84; 414/88
[58] Field of Search ...................... 414/83, 84, 87, 88, 414/91; 271/189, 201, 227, 245; 198/382, 400, 434, 592, 594, 812

[56] References Cited

U.S. PATENT DOCUMENTS

| | | | |
|---|---|---|---|
| 1,224,384 | 5/1917 | Kaukaine | 198/812 X |
| 2,477,830 | 8/1949 | Sandberg | 198/812 X |
| 2,658,630 | 11/1953 | Melin | 414/88 X |
| 3,143,344 | 8/1964 | Miller et al. | 271/201 X |
| 3,356,364 | 12/1967 | Grigereit | 271/245 X |
| 3,419,266 | 12/1968 | Martin | 414/88 X |
| 3,534,872 | 10/1970 | Roth et al. | 198/812 X |
| 3,781,004 | 12/1973 | Buddendeck et al. | 271/245 X |

FOREIGN PATENT DOCUMENTS

| | | | |
|---|---|---|---|
| 1204141 | 10/1965 | Fed. Rep. of Germany | 414/88 |
| 2523040 | 12/1976 | Fed. Rep. of Germany | 414/88 |
| 775937 | 5/1957 | United Kingdom | 271/201 |
| 1020205 | 2/1966 | United Kingdom | 414/88 |

*Primary Examiner*—Leslie J. Paperner
*Attorney, Agent, or Firm*—Douglas L. Carlsen; Michael E. Kiteck, Jr.

[57] ABSTRACT

A machine for stacking rectangular sheets of relatively rigid material such as panels, counters, doors, plastic sheets, or the like which has an input conveyor for receiving the panels as they are placed horizontally thereon, an elevator conveyor pivotally connected to the discharge end of the input conveyor on a horizontal axis for raising and lowering movement, a discharge conveyor at the outer end of the elevator conveyor, a conveyor drive motor for driving the conveyors, elevator motor for moving the elevator conveyor about its pivot axis, and a switch on the discharge conveyor for activating the elevator motor as a panel is discharged therefrom to raise the elevator conveyor a selected distance prior to discharge of the next panel. The machine also includes a mechanism on the input conveyor for straightening any panel disposed thereon prior to its movement onto the elevator conveyor.

4 Claims, 15 Drawing Figures

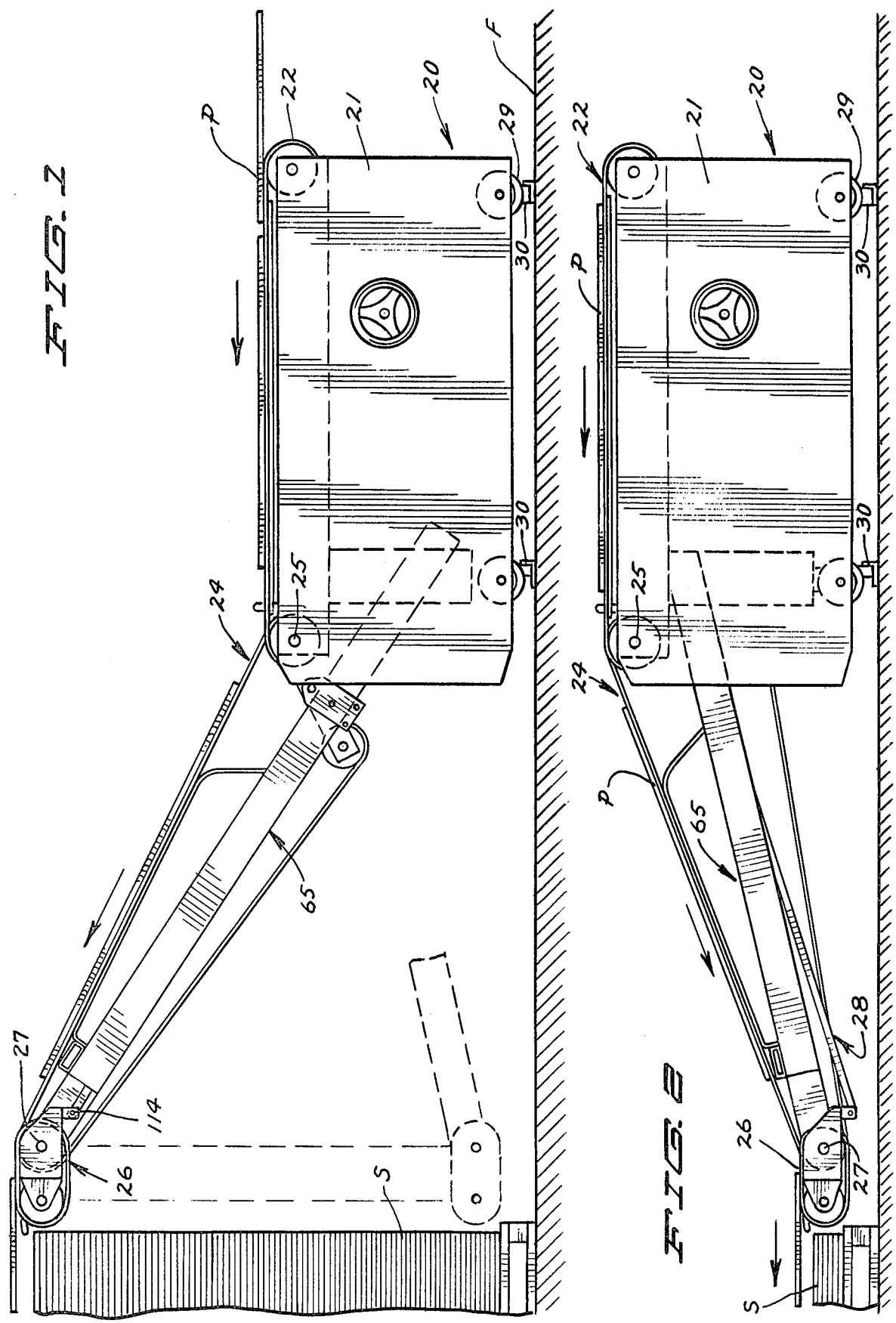

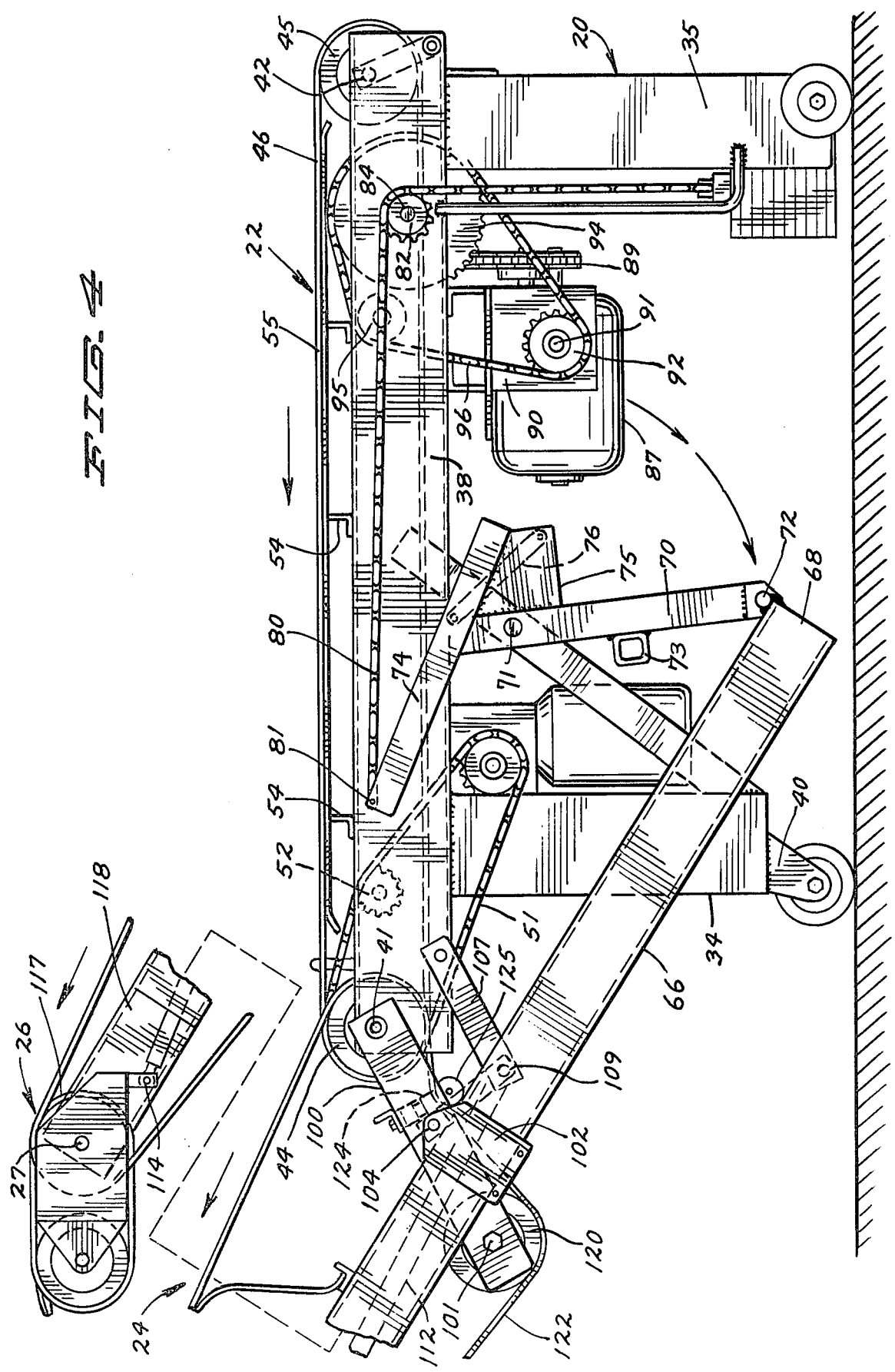

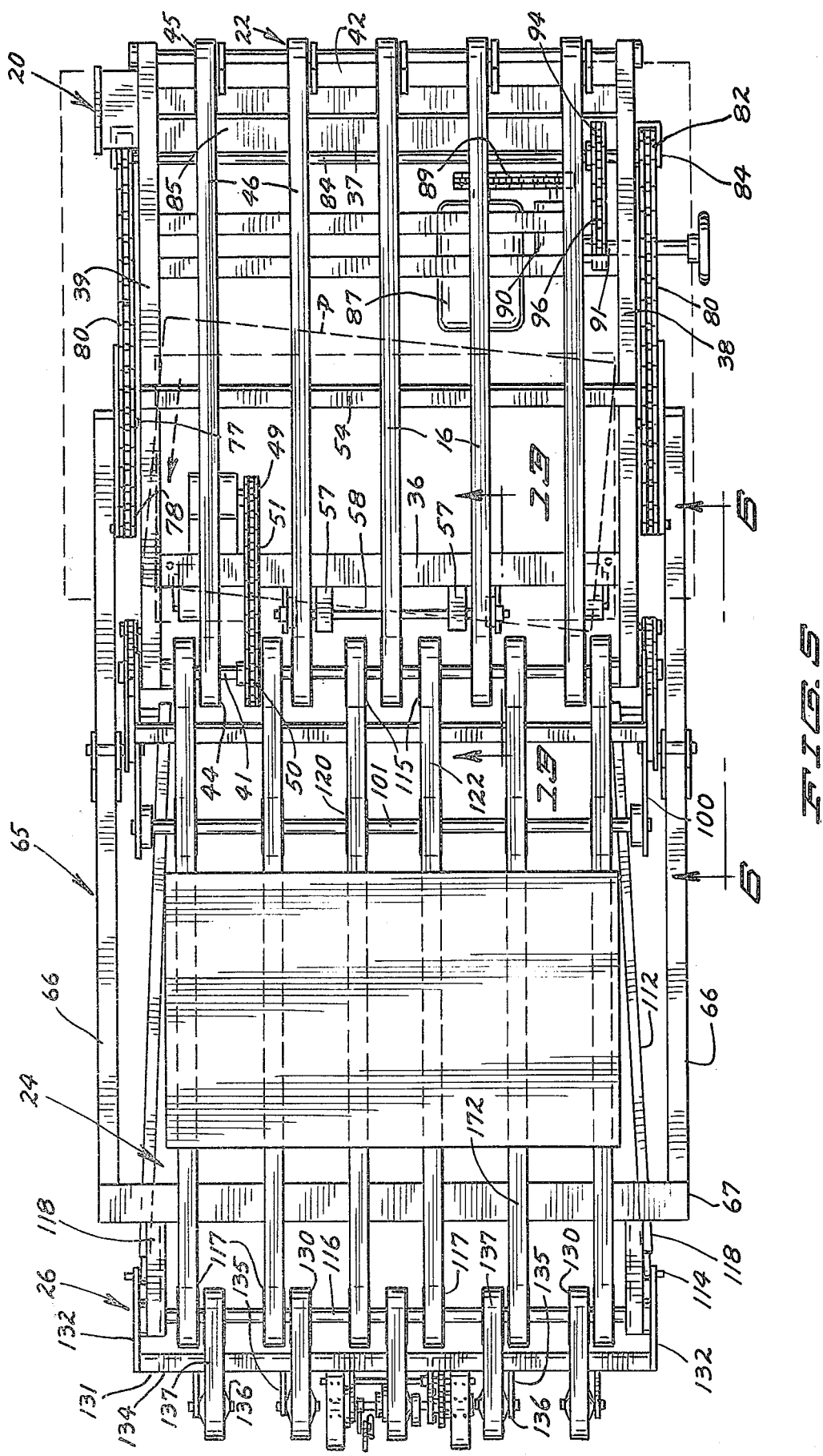

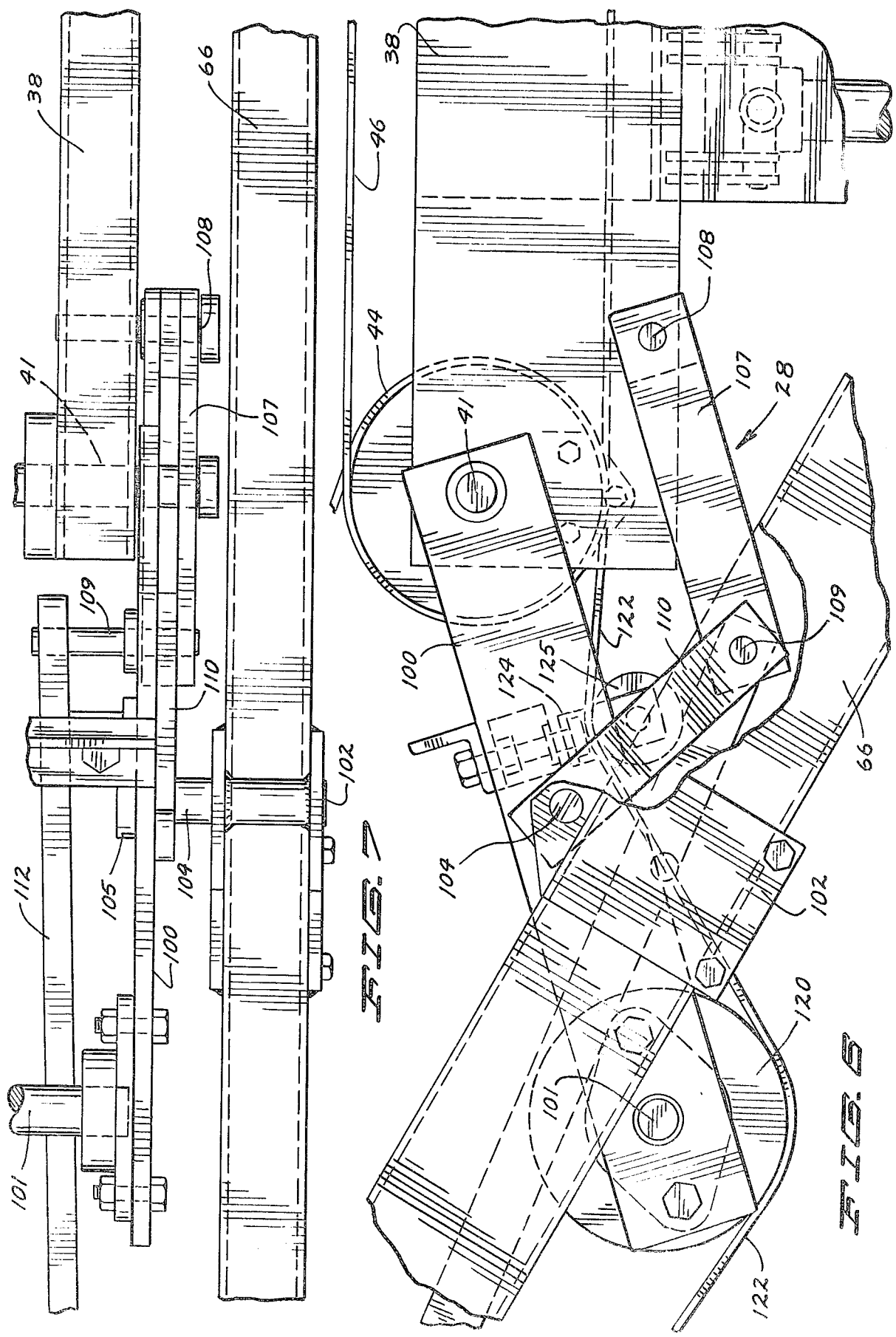

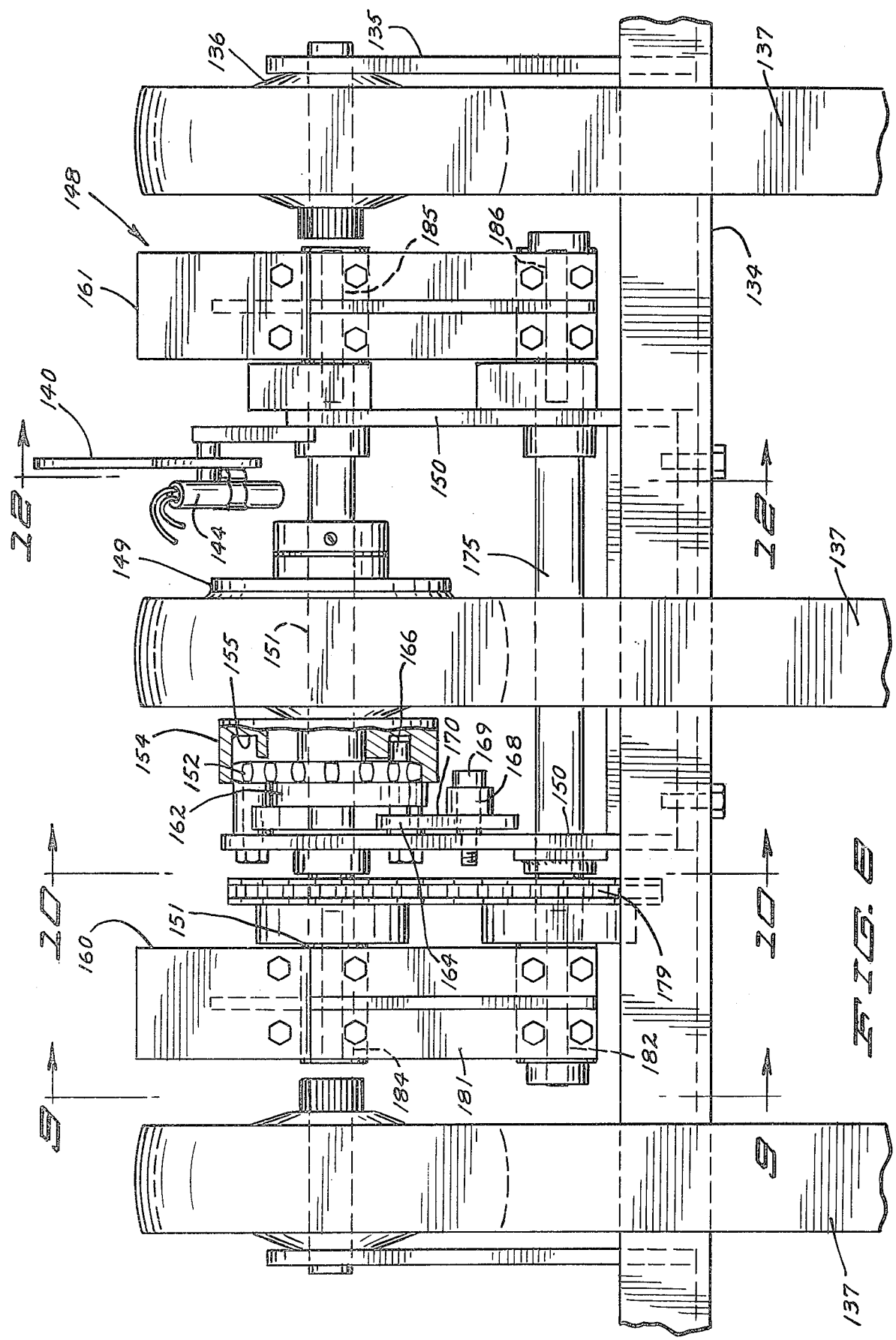

MACHINE FOR STACKING PANELS

BACKGROUND OF THE INVENTION

This invention relates generally to machines for stacking panels or sheets (the terms "panels" and "sheets" being used interchangeably herein) of plastic, plywood, plasterboard, counter tops, or the like in an even, well balanced pile on a floor surface, truck bed, pallet or other place of storage.

When the manufacture of a building panel, such as a sheet of plywood, is completed the panel is normally discharged from the output of a primary machine or a horizontal conveyor. As it is discharged from the conveyor the panel, normally 8' by 4', is grasped at each end by a worker and placed upon a pile on a pallet for storage and later movement to a lumber yard or building site.

Obviously, for proper balance and subsequent handling of the pallet the panels must be stacked evenly in the manner of a deck of cards. Inasmuch as these panels are relatively heavy and each must be deposited upon the stack at a slightly higher level than the preceding panel, the stacking heretofore has not readily lent itself to automation and to the applicant's knowledge has been done by hand as hereinbefore described. Where automatic stacking conveyors have been used the panels are dumped off of the discharge end of the conveyor requiring a backstop to aid in evening the stack.

The applicant is the owner of a copending application Ser. No. 890,258, filed Apr. 21, 1978, now abandoned, entitled Machine for Stacking Lumber, which is designed for stacking rows of side-by-side lumber boards in layers upon a pallet or the like.

SUMMARY OF THE INVENTION

The primary object of the present invention is to provide a machine for stacking panels of building material which receives the panels in succession as they come off of a conveyor line and places them in an evenly vertically stacked position upon a pallet or other horizontal surface, without recourse to sliding or track-type disposition.

Another object of the invention is to provide a machine for stacking panels which has a discharge means which is automatically elevated, as panels pass successively through the machine and the stack becomes higher, so that each panel is discharged horizontally onto the stack in vertical alignment with and just above the panel therebelow without the necessity of a backstop or other exterior means.

Another object is to provide a panel stacking machine which has an input conveyor for receiving the panels in a somewhat random manner and straightening them before they are discharged from the machine.

Still another object of the invention is to provide a panel stacking machine which is adapted to stack panels of varying lengths and widths.

Still another object of the invention is to provide a unitary machine for stacking building panels in a manufacturing plant which is readily movable between different locations in the plant.

With these and other objects in view the invention broadly comprises a fore and aft extending base frame supporting a horizontally disposed belt conveyor for receiving panels at its rearmost end and moving them forwardly thereover, an elevator conveyor disposed forwardly of the base frame and having its rear end portion pivoted on a transverse horizontal axis to the base frame for raising and lowering swinging movement of the elevator conveyor between various set positions, a discharge conveyor mounted on the forward end of the elevator conveyor, said elevator conveyor and discharge conveyor both moving forwardly in the same direction as the belt conveyor, means for automatically raising the elevator conveyor a predetermined distance as a panel is discharged from the discharge conveyor, and means for automatically adjusting the discharge conveyor to retain it in a horizontal position as the elevator conveyor is raised or lowered.

BRIEF DESCRIPTION OF THE DRAWINGS

In the drawings:

FIG. 1 is a side elevation of the panel stacking machine during operation with the discharge conveyor in an elevated position to load panels high upon a stack.

FIG. 2 is similar to FIG. 1 but showing the discharge conveyor in a relatively low position loading panels upon a pallet when the stack is low.

FIG. 4 is a side elevation similar to FIG. 3 but with the discharge conveyor elevated as in FIG. 1.

FIG. 5 is a plan view of the machine. A panel is shown in broken lines on the feed conveyor in a crooked position and in full lines on the elevator conveyor in a proper position for stacking after having been repositioned by the mechanism provided therefor.

FIG. 6 is an enlarged fragmentary side elevation of the mechanism joining the input and elevator conveyors taken on line 6—6 of FIG. 5.

FIG. 7 is a fragmentary plan view of the structure shown in FIG. 6.

FIG. 8 is an enlarged plan view of the central portion of the discharge conveyor.

DESCRIPTION OF THE PREFERRED EMBODIMENT

Figure 3:
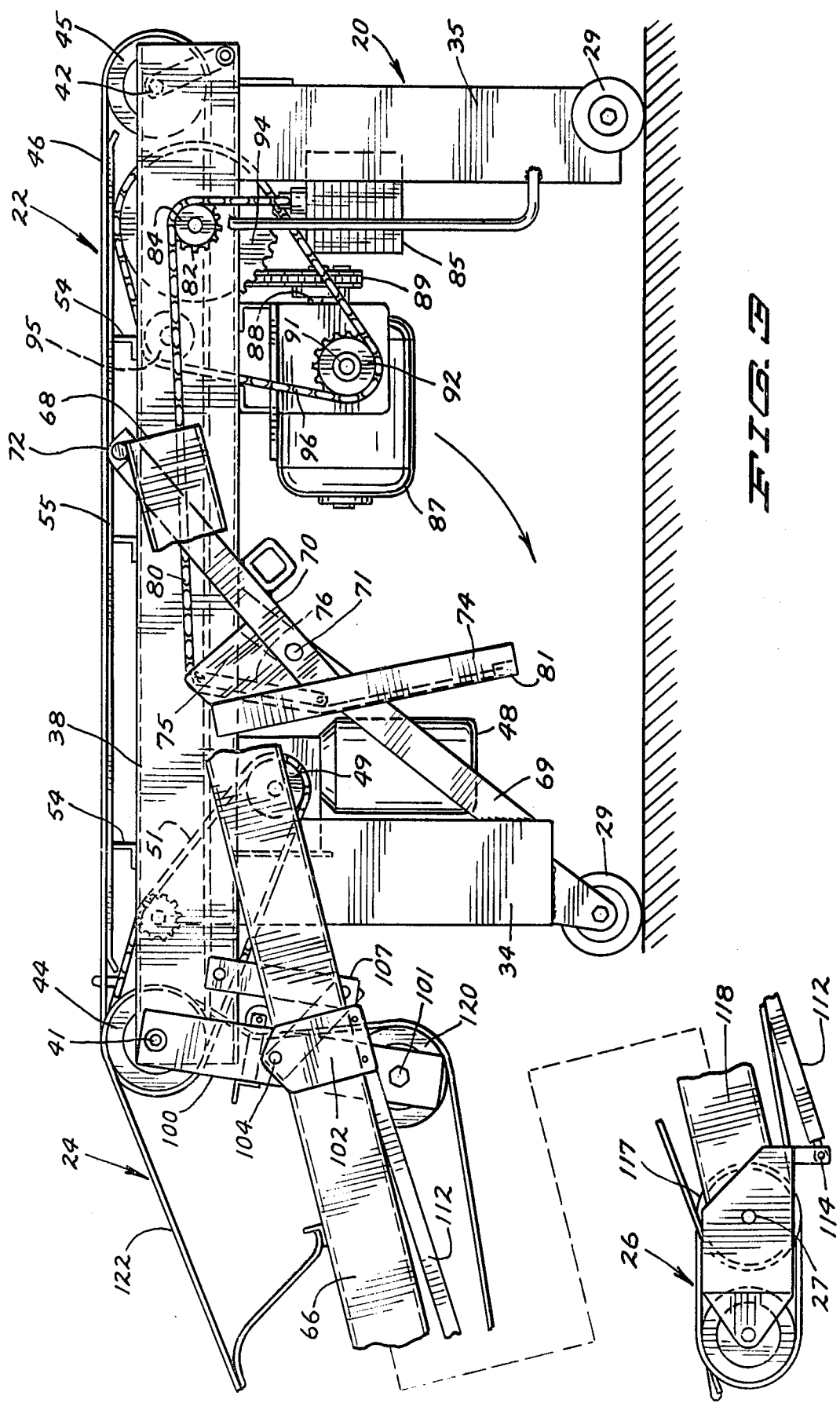
FIG. 3 is a side elevation of the machine in the lowered operating condition as shown in FIG. 2 and with the enclosure housing removed. Also the near side bar on the frame which supports the elevator conveyor is partially broken away for a better view of the mechanism therebehind.

Referring now more particularly to the drawings reference numerals will be used to denote like parts or structural features in the different views. The overall structure is best shown in FIGS. 1 and 2. It comprises a base frame denoted generally at 20 having an outer housing 21 and supporting an input conveyor 22 for conveying panels P received thereon forwardly along a horizontal plane. An elevator conveyor 24 extends forwardly from the base frame and has its inner end pivoted on a horizontal transverse axis at 25 for vertical swinging movement between a raised position, shown in FIG. 1, and a lowered position, shown in FIG. 2. A discharge conveyor, denoted generally at 26, is pivoted at 27 on a horizontal axis to the extended end of the conveyor 24. Linkage means denoted generally at 28 (FIGS. 2 and 8) are provided between the base frame 20 and conveyor 26 to retain conveyor 26 in a horizontally level position regardless of the position of elevation of conveyor 24. Base frame 20 is supported on ground wheels 29. Jacks 30 for raising wheels 29 off of the floor surface F to mount the frame in an immobile position are incorporated in the design.

As may be best observed in FIGS. 1 and 2 the machine receives panels P upon the input conveyor 22, preferably in a sidewise condition. The panels are conveyed forwardly along the machine, or to the left as viewed in FIGS. 1 and 2, on conveyor 22 onto the elevator conveyor 24, which during initial building of the stack is in the lowered position shown in FIG. 2. Each panel P then moves along conveyor 24 onto the discharge conveyor 26 which deposits the panel on the top of the stack S. As the panels are discharged onto the stack from the machine the elevator 24 is automatically elevated about pivot 25 to intermittently raise the conveyor 26 a distance equal to the thickness of the panel to a position shown in FIG. 1 in a manner hereinafter described.

Base frame 20 is a table-like structure with a pair of front legs 34 and a pair of rear legs 35 respectively interconnected by cross bars 36 and 37 (FIG. 5) and supporting fore and aft extending side beams 38 and 39 at each side of the frame. Wheels 29 are mounted on the lower ends of legs 34 and 35 and wheels on the front legs are preferably mounted in caster frames 40 (FIG. 4) allowing the front wheels 29 to swivel during movement of the machine.

A front conveyor shaft 41 (which forms pivot 25) extends transversely between the front portions of beams 38 and 39 and has its end portions journaled therein. A support means extending between rear portions of beams 38 and 39 carries a series of axially aligned shafts 42. The shafts 41 and 42 respectively carry sets of longitudinally aligned pulley wheels 44 and 45 around which the conveyor belts 46 are trained. A conveyor drive motor 48 is mounted on the base frame 20 and drives a sprocket or gear 49 about an axis parallel to shaft 41. A sprocket or gear 50 (FIG. 5) is keyed to shaft 41 in longitudinal alignment with gear 49 and a drive chain 51 provides a driving connection between these gears. An adjustable idler sprocket 52 is disposed intermediate gears 49 and 50 and the chain 51 is trained thereover. Accordingly, as the motor 48 is energized it will drive the input conveyor 22 through the drive chain 51 and shaft 41 with the top run of the belts 46 moving forwardly toward the elevator conveyor 24 as denoted by the arrow in FIG. 4.

Beams 38 and 39 carry a series of angle iron cross bars 54 which are spaced apart between the shafts 41 and 42. These bars support elongated belt support or table plates 55 which extend along and under the upper run of each belt 46 to prevent the belt from sagging and retain a horizontal surface. Actually in the embodiment of the invention shown plates 55 may be one continuous plate covering the areas between the belts as well as extending under them.

Figure 13:
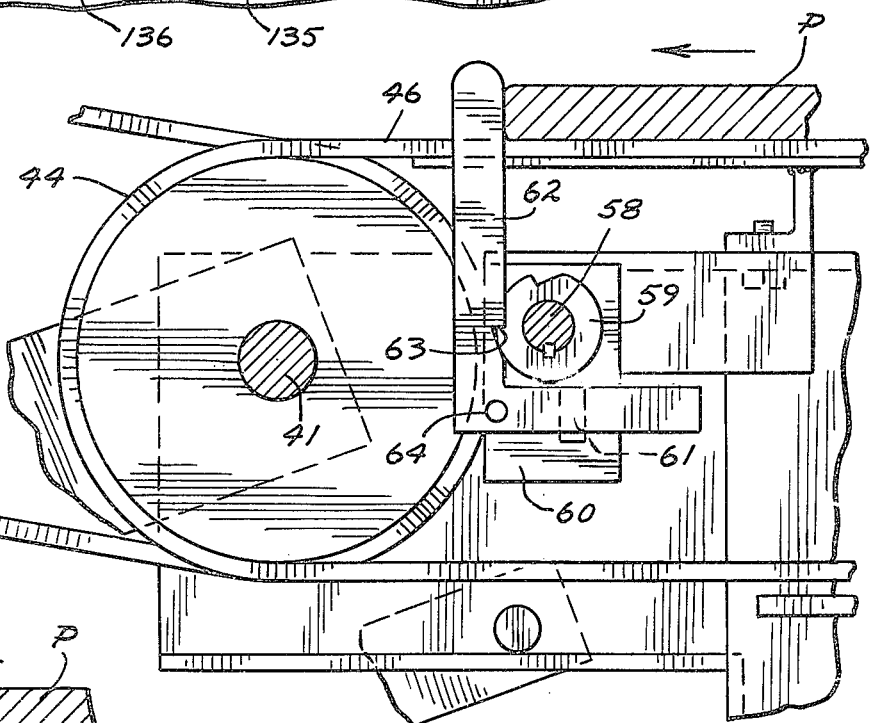
FIGS. 13, 14 and 15 are all longitudinal vertical sections taken on line 13—13 of FIG. 5 showing different positions of the panel alignment mechanism.

The panel straightening device which is an optional feature of the invention will now be described with particular reference being made to FIGS. 5 and 13 through 15. FIG. 5 shows, in broken lines, a panel P moving forwardly or toward the left on the input conveyor 22 in a skewed or oblique position due to the manner in which the panel is deposited onto the conveyor. A pair of brackets 57 suitably mounted on the base frame 20 in transversely spaced position jointly carry a cross shaft 58. This shaft 58 has a pair of latch dogs 59 mounted thereon. A pair of plates 60 are journaled on the shaft 58 one adjacent each dog 59. These plates are interconnected by a cross bar 61. An L-shaped stop finger 62 is pivoted at 64 to each plate 60. These fingers project upwardly between belts 46 in transversely spaced positions. The lower leg of each member 62 projects under a dog 59 and is spaced slightly below the dog, as shown in FIG. 13, before actuation of the stop finger. Each finger 62 has a notch 63 which engages in a notch in dog 59.

In operation fingers 62 are normally in the position shown in FIG. 13. When a panel P engages one of the fingers 62 it will move the finger to the position shown in FIG. 14 removing the notch 63 from engagement with the dog 59 and bringing the lower leg of member 62 into engagement with the bottom of the dog. However, the mechanism remains in this position until the other finger 62 is also unlocked and moved to the position shown in FIG. 14. It will be understood that with one side of the panel P being held until the other side catches up will straighten the panel on the conveyor so that the longitudinal center line of the panel is perpendicular to the direction of travel.

Figure 14:
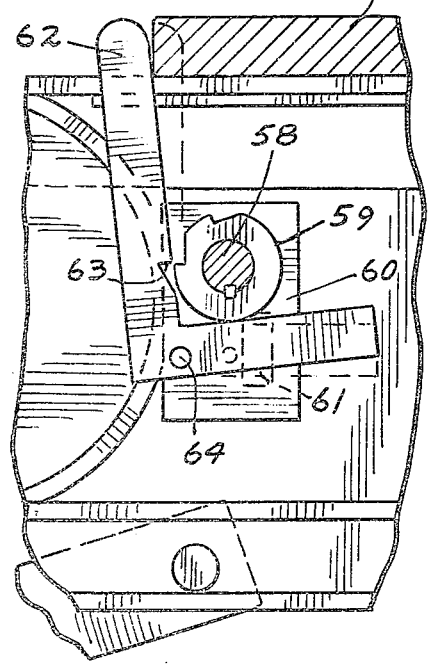
Figure 15:
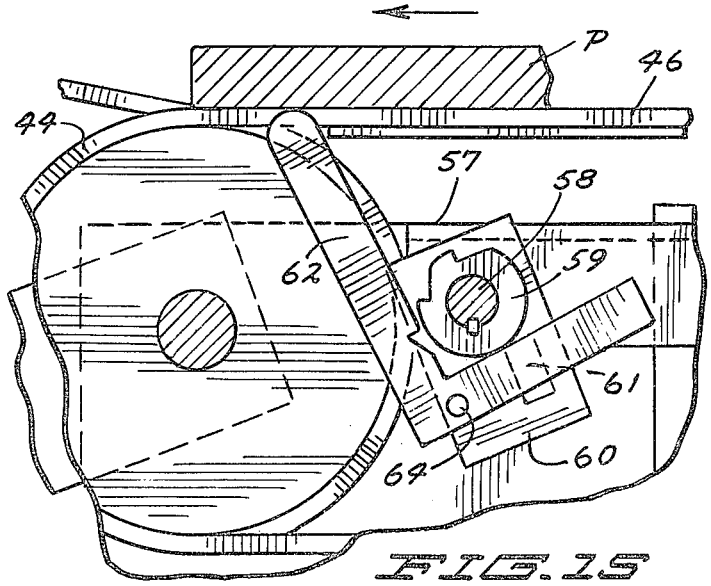

When both finger members are moved to the position of FIG. 14 the plates 60 are unlocked and the fingers, plates and cross bar 61 all swing to the position shown in FIG. 15 allowing panel P to pass over the tops of the fingers. After the panel P has passed thereover the entire mechanism 62, 60, 61 will gravitationally return about the shaft 58 to the position shown in FIG. 13 with the fingers 62 relatching with dogs 59.

The elevator conveyor 24 and its connection with the base frame 20 and input conveyor 22 will now be described. The conveyor 24 is swingable between the positions shown in FIGS. 1 and 2 about the axis of shaft 41 which provides pivot 25. However, it is so designed as to retain the discharge conveyor 26, at the extended end of conveyor 24, on a vertical path during such swinging movement. This is necessary to provide a vertically aligned stack S.

A frame 65 which includes a pair of fore and aft extending side beams 66 connected at their front ends by a cross bar 67 supports the conveyor 24. This frame 65 is connected to the base frame 20 by a linkage best shown in FIGS. 3 and 4. Inasmuch as this linkage is the same at both sides of the machine only the left side will be described. A bracing member 69 angles upwardly and rearwardly from the lower end of leg 24 to the side beam 38 of the frame and is integrally connected thereto. A pivot arm 70 is pivoted near one end on a transverse axis at 71 to the member 69. The opposite end of arm 70 is pivotally connected as at 72 to the rear end 68 of the frame 65. Arms 70 are connected by a cross bar 73.

On the opposite end of arm 70 from pivot 72 a cross bar 74 is integrally mounted. This mounting includes a gusset plate 75. A bar 76 is mounted on the inner side of each plate 75. The purpose of this bar will be subsequently explained.

A length of roller or pitch chain 80 has one end connected as at 81 to the longer end portion of bar 74 which portion extends downwardly from arm 70 when the elevator conveyor is in its lowered position, as in FIG. 3. From its connection at 81 the chain 80 extends upwardly and over the bar 76 and then rearwardly over a toothed gear or sprocket 82 which is keyed to a shaft 84 journaled for rotation on a transverse axis on the base frame 20. The chain 80 depends downwardly from gear 83 and suspends weight 85 from its rearmost end. It will be understood that there is a chain 80 at each side of the machine and they are connected to a common weight means.

An electrically energized elevator motor 87 is mounted on base frame 20 at a transversely medial location. This motor drives a shaft 88 which is connected through a drive train denoted generally at 89 to a friction clutch 90 mounted on shaft 91 which carries a gear 92. Gear 92 is in alignment with a large spur gear 94 keyed to shaft 84. An adjustable idler gear 95 is mounted on frame 20 in alignment with gears 92 and 94, and a drive chain 96 is trained around all three of these gears.

When motor 87 is energized it will drive the shaft 91 through the gear train 89 and clutch 90. The clutch 90 engages the shaft 91 with sprocket 92 whereby sprocket 94 is driven by sprocket 92 through chain 96. This causes rotation of shaft 84 and sprocket 82 in a clockwise direction, as viewed in FIG. 3, to pull the chain 80 rearwardly. As this occurs, the arm 70 is swung downwardly about its pivot at 71 from the position shown in FIG. 3 toward the position of FIG. 4. This, of course, exerts downward pressure on the rear ends of beams 66 at pivots 72.

The support for the medial portion of conveyor 24 may best be understood by reference to FIGS. 6 and 7, with reference also being made to FIGS. 3 and 4. A pair of conveyor support arms 100 are journaled in transversely spaced relation, one at each side of the machine on shaft 41 to extend downwardly and forwardly therefrom. These arms jointly support a cross shaft 101 at their extended ends. Each side beam 66 has a bracket 102 mounted thereon, the upper portion of which carries a stub shaft 104 which is pivoted on a transverse axis at 105 (FIG. 7) to arm 100. Accordingly, the arms 100 and brackets 102, pivotally connected thereto, support the medial portions of beams 66 when they are swung about their rear end pivots at 72.

Another linkage (best shown in FIGS. 6 and 7) between the members 38 and 100 at each side of the machine comprises a link 107 having its rear end pivoted as at 108 to beam 38 and its forward end pivoted as by pin 109 to the rear end of a link 110 which has its forward end journaled on shaft 104. While this linkage does not control the arm 100 it moves therewith as will be noted from the different positions in FIGS. 3 and 4.

A pair of leveling rods 112, again one at each side of the machine, extend in fore and aft directions along conveyor 24. Each of these rods has its rear end pivoted on pin 109 and its forward end pivoted to the discharge conveyor at 114.

The elevator conveyor 24, supported by the frame 65, includes a series of pulley wheels 115 which are mounted on shaft 41 interspaced between the pulley wheels 44 (FIG. 5). A shaft 116 which is journaled in forward extensions 118 of the frame 65 carries a plurality of pulley wheels 117 which are transversely spaced along shaft 116 and longitudinally aligned one with each pulley 115. Shaft 101 also carries a plurality of pulley wheels 120 one longitudinally aligned with each set of aligned pulleys 115 and 117. Belts 122 are trained around each set of longitudinally aligned pulleys 115, 117, and 120. An adjustable belt tensioning mechanism 124 is mounted on member 100 and carries pulley 125 (FIG. 4) for adjusting the tension on belts 122.

When the frame 65 is in its lowered position, as in FIGS. 2 and 3, and the motor 87 is energized, the chain 80 will be moved by the gear 82 in a rearward direction. This exerts a downward pressure through bars 74 and 70 on the pivot 72 at the rear ends of beams 66 causing the forward portion of frame 65 to swing upwardly about the pivot at 104. Weight 85 counterbalances the weight of the frame 65 and aids in raising the frame.

Inasmuch as the pivot 72 moves forwardly in its downward movement about the fixed pivot 71, the frame is moved forwardly relative to the base frame 20 while the frame is raised so that the pivot axis at 27 rises along a vertical plane. Frame 65 is, in fact, moved slightly rearward during initial movement until the pivot axis at 72 passes downwardly below the axis 104. In any event the conveyor 26 is carried along a vertical path.

As the conveyor 24 is raised or lowered the runs of each belt 122 thereof between each pulley 117 and its corresponding aligned pulleys 44 or 120 will vary in length. However, this is automatically adjusted, with one run automatically shortening as the other is lengthened, by virtue of the fact that the pivot 104 is located medially between the shafts 41 and 101.

As the frame 65 is caused to move forwardly and upwardly between the position shown in FIG. 3 and the position shown in FIG. 4, causing bars 100 to swing forwardly about shaft 41, the links 107 and 110 will spread about their pivotal interconnection at pin 109 as said pin is pulled forwardly. This causes the leveling arms 112 to also move forwardly and keep the conveyor 26 in a horizontally level position in the manner of a parallel swinging bracket.

The discharge conveyor 26 itself will now be disclosed in greater detail with special reference being made to FIGS. 5 and 8 through 12. As hereinbefore described, the frame extensions 118 support the shaft 116 which carries the pulley wheels 117 and the level of the conveyor is controlled by the leveling arms 112 which adjust the conveyor about the axis of shaft 116.

A plurality of pulley wheels 130 are mounted in transversely spaced positions on shaft 116 disposed alternately with and between the pulleys 117. The conveyor 26 has a generally U-shaped frame 131 with side plates 132 connected to the ends of a cross beam 134. Plates 132 journal the ends of shaft 116 and are pivotally connected at 114 with the leveling arms 112. A plurality of pulley wheel mounting brackets 135 extend forwardly from cross beam 134 and each journals a pulley wheel 136 with said wheels having a common transverse rotary axis and being respectively longitudinally aligned one with each pulley wheel 130. Conveyor belts 137 are trained over each set of pulley wheels 130 and 136. It will now be understood that conveyor 26 is driven simultaneously with conveyor 24 through the shaft 116.

Figure 10:
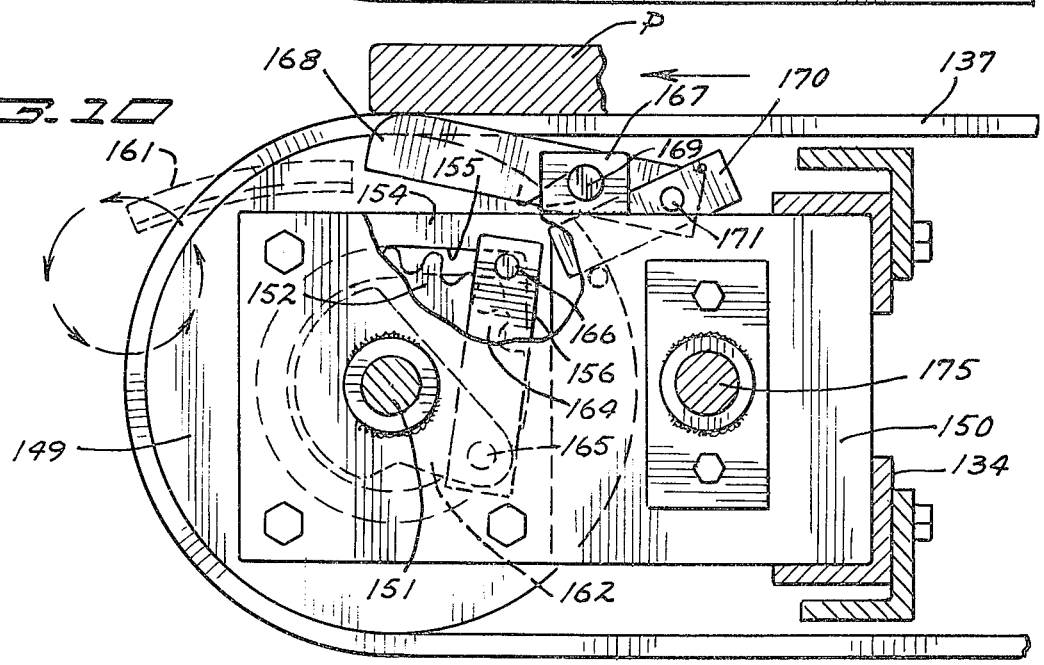
FIG. 10 is a longitudinal vertical section taken on line 10—10 of FIG. 8 with a panel passing over and depressing the trip mechanism.
Figure 11:
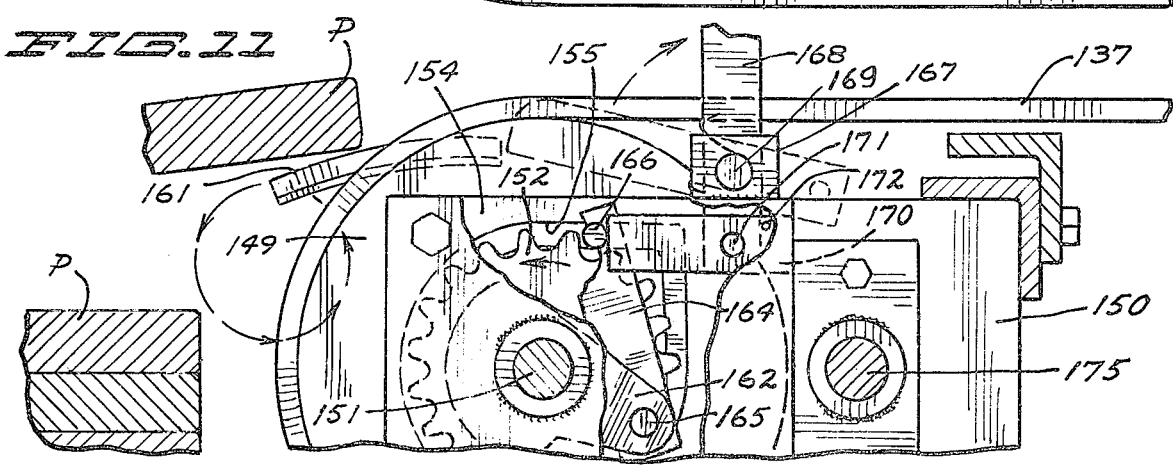
FIG. 11 is a section similar to FIG. 10 but with the panel having passed over the trip mechanism so as to have released the same.
Figure 12:
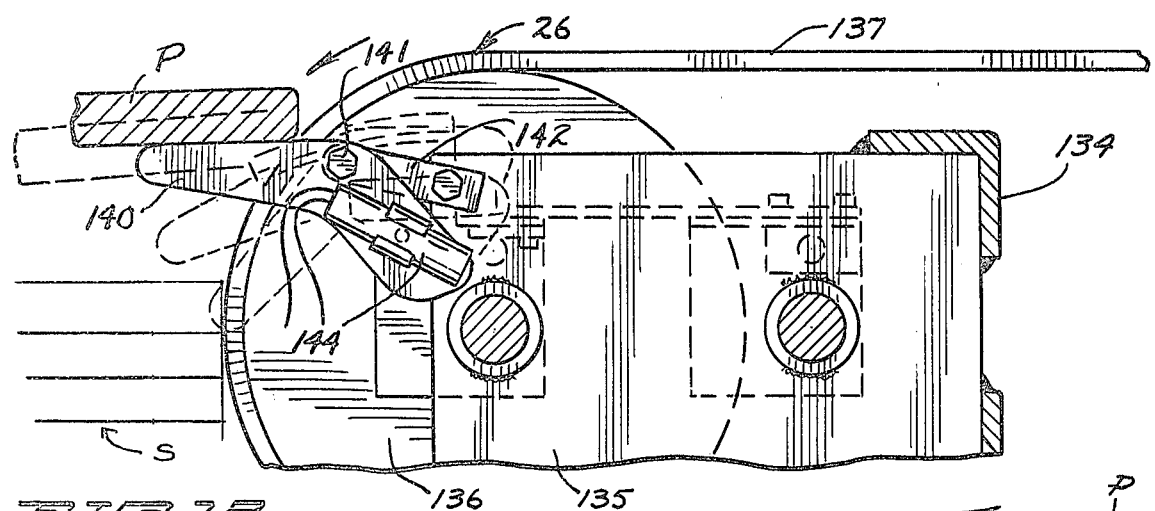
FIG. 12 is a longitudinal vertical section taken on line 12—12 of FIG. 8.

Referring to FIG. 12 it will be noted that as a panel P is discharged from the conveyor 26, it will pass over a finger 140 which is pivoted as at 141 to an arm 142 which is suitably mounted on the conveyor. Finger 140 carries a mercury switch 144 which when tilted to a certain point completes a circuit to the motor 87 to energize the same and cause the frame 65 to be raised thereby in a manner hereinbefore described. The switch is not actuated until finger 140 is depressed to its lowermost position and it is held depressed by the side of the stack until the discharge conveyor has elevated sufficiently. Finger 140 then gravitation-returns to its upright position and the circuit to the motor is opened. The period of energization of motor 87 and accordingly the distance of elevation of the conveyor is thus controlled by finger 140. The description and operation of the drop off shoe assembly will be best understood by reference to FIGS. 8 through 11.

A pair of central bracket plates 150 extend forwardly from cross beam 134 in the same manner as plates 135. These plates 150 jointly journal a shaft 151. The center pulley wheel 136, here designated as 149, is journaled on shaft 151 and is axially connected to a spur gear 152. Gear 152 accordingly rotates constantly while the machine is in operation and rides within a housing 154 which is fixed to plate 150 and which has an annular cam follower track 155 formed therein. There is a relief recess 156 (FIG. 10) provided in track 155.

Immediately outside, or to the left as viewed in FIG. 8 of the gear 152, shaft 151 has a crank arm 162 keyed thereto. An upright link 164 has its lower end pivotally connected as at 165 to the arm portion of crank arm 162. The upper end of link 164 carries a dog 166 which normally rests in the recess 156, as in FIG. 10, but which may be forced forwardly into locking engagement with gear 152, as shown in FIG. 11. Plate 150 carries a bracket 167 which has an upright finger 168 pivoted thereto as by bolt 169. Finger 168 has a push bar 170 pivoted as at 171 to the lower end thereof and carries a stop 172 for limiting pivotal movement of the bar 170 about pivot 171. Push bar 170 is engageable endwise with the dog 166 to force it into locking engagement with the gear 152 as shown in FIG. 11. A torsion spring may be provided at pivot 165 to yieldably retain the link 164 in the position shown in FIG. 10 with the dog 166 seated in the recess 156. A spring 174 connects the lower end of finger 168 to a forward point on plate 150 to yieldably retain the finger in upright position.

It will be understood that while the machine is running the center pulley 149 and gear 152 will be constantly rotating. However, the shaft 151 and crank arm 162, keyed thereto, will be idle. This situation prevails while a panel P is passing over the finger 168 to depress the finger as shown in FIG. 10.

However, after the panel P has passed over finger 168 the finger under tension of spring 174, as well as by gravity, will move to the position shown in FIG. 11. As this occurs the push bar 170 engages the dog 166 and pushes it into one of the grooves between the teeth in gear 152. This immediately locks the crank arm 162 to the rotating gear 152 and the arm and shaft 151 to which it is keyed will rotate therewith.

The rotation of shaft 151 will continue for one revolution. Then as the dog 166 rises along the back side of the groove 155 it will centrifugally and with the help of the torsion spring on pivot 165 slide into the recess 156. This disengages the shaft 151 from gear 152 until dog 166 is reengaged with the gear.

The drop off shoe assembly denoted generally at 148 has a pair of drop off shoes 160 and 161 spaced one on each side of the center pulley 149. These shoes are designed and mounted to gradually lower the trailing edges of the panels P onto the stack. The motion and means of operation of these shoes will now be described.

A shaft 175 is journaled in bearings mounted on plates 150 and is parallel to and horizontally level with the shaft 151. On the left-hand side, as viewed in FIG. 8, the shaft 151 carries a gear 177 which is keyed thereto and similarly a gear 178 is keyed to shaft 175 with the two gears being aligned on a longitudinal vertical plane and having a chain 179 trained thereover. It will accordingly be understood that when shaft 151 is rotated the gears 177 and 178 and shaft 175 will be driven thereby.

Figure 9:
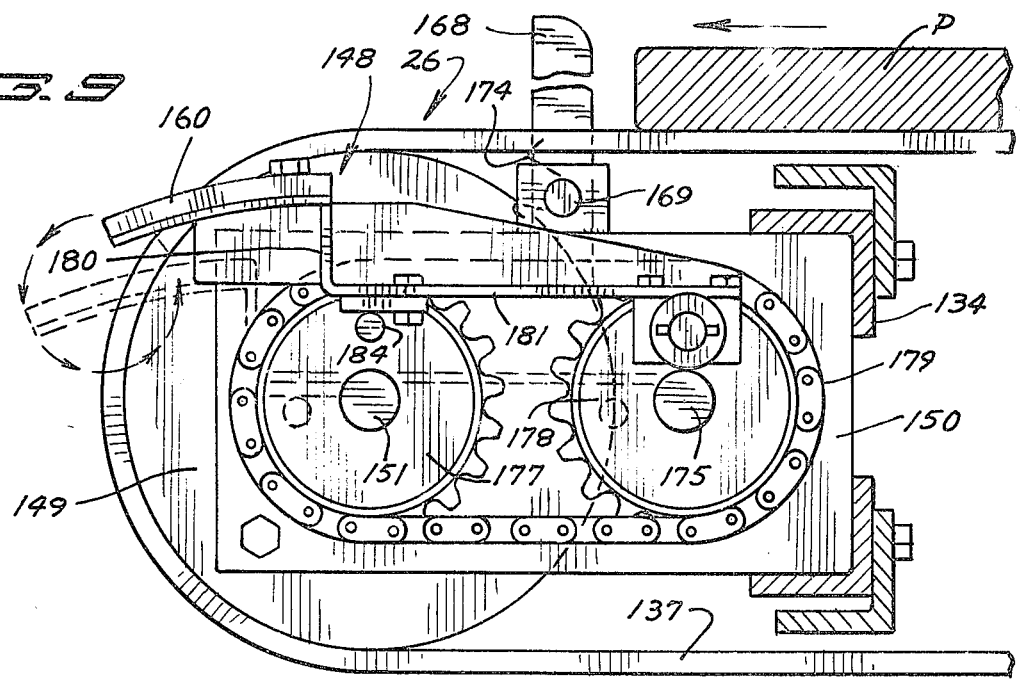
FIG. 9 is a longitudinal vertical section taken on line 9—9 of FIG. 8 with a panel about to engage the trip mechanism which controls the motion of the drop off shoe assembly.

Drop off shoe 160 is mounted on a Z-bracket 180 (FIG. 9). This bracket has a horizontal leg 181 the rear end of which is journaled as at 182 on a pin mounted on gear 178 and the front portion of which rides on pin 184 on gear 177.

The shafts 151 and 175 respectively carry pins 185 and 186 on the opposite, or right side, of pulley 149 to support the drop off shoe 161. Pins 185 and 186 are respectively aligned transversely with pins 184 and 182 and identically offset from the axes of shafts 151 and 175 so that the drop off shoes 160 and 161 move simultaneously.

In operation as panel P passes over the finger 168, as in FIGS. 9 and 10, and is discharged from the discharge conveyor 26, as in FIG. 11, the return of finger 168 to its upright position will cause link 164 to lock the crank arm 162 to gear 152. This causes the shaft 151 to rotate one complete revolution as hereinbefore described.

The rotation of shaft 151 also drives 175 one complete revolution through the chain 179. This causes the shoes 160 and 161 and their supporting brackets to also move in a circle about a transverse axis. The shoes themselves are lowered and retracted between the belts 137 on either side thereof. The rear end of panel P resting thereon is accordingly gently lowered upon the panel stack in properly aligned position without any bang down of the panel. These drop off shoes eliminate the need for a back board. As this occurs the mercury switch 144 has briefly energized motor 187 to raise the frame 65.

At the completion of the single revolution of shaft 151 the shoes will be retained to the original position awaiting reactivation by the discharge of the next panel P.

The discharge conveyor 26 accordingly is automatically leveled and incorporates both a mechanical switch for raising the elevator conveyor and means for gently discharging a panel onto the stack at any elevation.

The path of vertical movement of the discharge conveyor 26 is made possible by virtue of the particular arrangement of the pivots supporting the inner or rearward portion of the frame 65 supporting the elevator conveyor. This frame support encompasses the pivots at 41, 71, 72, and 104, the first two of which are fixed on the base frame 20 and the latter two of which are so related with respect to the fixed pivots and beams 66 to retain the desired vertical path. During raising or lowering of the elevator conveyor 24 the belts 122 remain taut due to the medial pivot of members 100 at 104 which permits compensation in length of the upper and lower belt runs.

Referring back to the input conveyor 22, a plan view of which is shown in FIG. 5, it may be desirable to incorporate a means for moving panels laterally onto this conveyor or crosswise of the line of conveyor travel. This could be accomplished by providing a set of rollers disposed intermittently between belts 46 for rotation on fore-and-aft extending axes and with means supporting the rollers for vertical adjustment between a loading or upper position penetrating the plane of the upper run of belts 46 and a retracted or lowered position below said plane.

Having now therefore fully illustrated and described the invention, what I claim to be new and desire to protect by U.S. Letters Patent is:

1. In a machine for stacking rectangular panels of building material or the like,
    (a) an input conveyor for receiving panels at its rear end and conveying them forwardly therealong,
    (b) an elongated elevator conveyor pivoted to the forward end of the input conveyor for receiving and further conveying panels from said end of the input conveyor,
    (c) an elongated discharge conveyor pivoted to the extended end of the elevator conveyor for further conveying panels beyond the end of the elevator conveyor and onto a stack, wherein said discharge conveyor has a drop off shoe assembly at its forward end to catch the rear edge portion of a panel as it leaves the conveyor, and stop means on said conveyor actuated by the panel for lowering the shoe assembly to slowly deposit the panel upon a stack thereof,
    (d) the elevator conveyor pivot and the discharge conveyor pivot lying on parallel axes,
    (e) a first power means for driving all three conveyors to convey panels successively and forwardly therealong until they are discharged from the discharge conveyor, and
    (f) a second power means for elevating the elevator conveyor about its pivotal connection with the input conveyor.

2. The subject matter of claim 1 wherein said shoe assembly includes a pair of shoes spaced transversely relative to the path of travel positioned to carry the rear edge portion of the panel during said lowering movement.

3. In a machine for stacking rectangular panels of building materials or the like which machine has an input conveyor for receiving panels and conveying them toward and onto an elevator conveyor pivotally mounted at one end of the input conveyor for swinging movement about a horizontal axis so that the elevator conveyor may move the panels onto a stack at different elevations, there being electrically energized power means for driving the conveyors and adjusting the elevator conveyor about its pivot axis, and the elevator pivotal mounting including leveling means for confining the extended end of the elevator conveyor to a substantially vertical path during the swinging movement thereof, wherein the elevator conveyor has a continuous conveyor belt the top run of which varies in length during the raising and lowering of said conveyor, and including means for compensation in length of the upper and lower belt runs for retaining the belt in taut condition during such variance, wherein the means for compensation comprises a bar pivotally mounted at one end to a base frame of the machine, which bar has pulleys mounted at either end for supporting a continuous conveyor belt, and which bar has a medial pivot at which point it is attached to an elevator conveyor frame to support the frame.

4. In a machine for stacking rectangular panels of building material or the like,
    (a) an input conveyor for receiving panels at its rear end and conveying them forwardly therealong,
    (b) an elongated elevator conveyor the top run of which is of variable length pivoted to the forward end of the input conveyor for receiving and further conveying panels from said end of the input conveyor,
    (c) leveling means for confining the extended end of the elevator conveyor to a substantially vertical path during the pivoting movement thereof,
    (d) an elongated discharge conveyor pivoted to the extended end of the elevator conveyor for further conveying panels beyond the end of the elevator conveyor and onto a stack,
    (e) the elevator conveyor pivot and the discharge conveyor pivot lying on parallel axes,
    (f) a first power means for driving all these conveyors to convey panels successively and forwardly therealong until they are discharged from the discharge conveyor, and
    (g) a second power means for elevating the elevator conveyor about its pivotal connection with the input conveyor, wherein said leveling means further includes a plurality of pivot arms pivoted at one end to a base frame and at the other end to the elevator conveyor frame, the lengths and pivot points of the pivot arms determining the travel of the elevator conveyor frame and wherein a pivot arm extends beyond the elevator conveyor frame to a third pivot point so that the elevator conveyor frame pivot is medial to the arm and pulleys mounted at each of the end pivots to support a continuous conveyor belt in conjunction with a third pulley at the end of the elevator conveyor frame pivot so that the conveyor belt path is close to a constant length regardless of the angle of the arm relative to the elevator conveyor frame.

* * * * *